US006731724B2

(12) United States Patent
Wesemann et al.

(10) Patent No.: US 6,731,724 B2
(45) Date of Patent: May 4, 2004

(54) VOICE-ENABLED USER INTERFACE FOR VOICEMAIL SYSTEMS

(75) Inventors: Darren L. Wesemann, North Salt Lake, UT (US); Makani Mason, Salt Lake City, UT (US); Jon Willesen, West Valley City, UT (US); Tae-Deok Kweon, Salt Lake City, UT (US); Dong-Kyun Nam, Murray, UT (US)

(73) Assignee: Pumatech, Inc., San Jose, CA (US)

( * ) Notice: Subject to any disclaimer, the term of this patent is extended or adjusted under 35 U.S.C. 154(b) by 43 days.

(21) Appl. No.: 09/887,215

(22) Filed: Jun. 22, 2001

(65) Prior Publication Data

US 2002/0097848 A1 Jul. 25, 2002

Related U.S. Application Data

(60) Provisional application No. 60/263,469, filed on Jan. 22, 2001.

(51) Int. Cl.[7] .................................................. H04M 1/64
(52) U.S. Cl. ............................... 379/88.16; 379/88.01; 379/88.18; 704/231; 704/270.1; 455/563
(58) Field of Search ........................... 379/88.01, 88.03, 379/88.04–88.09, 88.13–88.25, 93.01, 93.26–93.28, 218.01; 455/79, 563; 704/270.1, 277, 231, 246, 270

(56) References Cited

U.S. PATENT DOCUMENTS

| | | | | |
|---|---|---|---|---|
| 5,208,848 A | * | 5/1993 | Pula | 379/196 |
| 5,353,336 A | * | 10/1994 | Hou et al. | 370/354 |
| 5,471,521 A | * | 11/1995 | Minakami et al. | 379/88.01 |
| 5,659,597 A | * | 8/1997 | Bareis et al. | 379/88.01 |
| 5,737,393 A | | 4/1998 | Wolf | |
| 5,822,405 A | * | 10/1998 | Astarabadi | 379/352 |
| 5,864,605 A | | 1/1999 | Keshav | |
| 5,864,804 A | * | 1/1999 | Kalveram | 704/233 |
| 5,905,774 A | * | 5/1999 | Tatchell et al. | 379/88.01 |
| 5,953,393 A | * | 9/1999 | Culbreth et al. | 379/88.25 |
| 5,999,611 A | * | 12/1999 | Tatchell et al. | 379/197 |
| 6,014,428 A | | 1/2000 | Wolf | |
| 6,044,133 A | * | 3/2000 | Furukawa et al. | 379/88.01 |
| 6,088,428 A | * | 7/2000 | Trandal et al. | 379/189 |
| 6,094,476 A | * | 7/2000 | Hunt et al. | 379/88.04 |
| 6,144,938 A | | 11/2000 | Surace et al. | |
| 6,167,251 A | * | 12/2000 | Segal et al. | 455/405 |
| 6,173,042 B1 | * | 1/2001 | Wu | 379/67.1 |
| 6,195,417 B1 | * | 2/2001 | Dans | 379/352 |
| 6,198,947 B1 | * | 3/2001 | Barber | 379/88.02 |
| 6,349,132 B1 | * | 2/2002 | Wesemann et al. | 379/88.01 |
| 6,389,398 B1 | * | 5/2002 | Lustgarten et al. | 704/270 |
| 6,501,832 B1 | * | 12/2002 | Saylor et al. | 379/88.04 |
| 2002/0001370 A1 | * | 1/2002 | Walker et al. | 379/88.04 |

OTHER PUBLICATIONS

H. Newton, Newton's Telecom Dictionary, ISBN 1–57820–023–7, Mar. 1998, Flatiron Publishing, 14th ed., pp. 72 and 73.*

* cited by examiner

Primary Examiner—Roland G. Foster
(74) Attorney, Agent, or Firm—Workman Nydegger

(57) ABSTRACT

A voice-enabled user interface and method for enabling a user that is providing audio and vocal input to access data from telephone service systems that are only responsive to dual tone multi-frequency ("DTMF") signals. A user access the voice-enabled user interface with a telephone device and provides input that is translated into a DTMF translation that can be recognized by DTMF telephone service system. A template of the voice-enabled user interface maps menu states, prompts, and acceptable inputs of the DTMF telephone service system. The template also monitors the current state of the telephone service system at all times. The invention also enables a user to jump from one menu state to another menu state of the telephone service system without having to enter input for each menu state between the first and the second menu states.

28 Claims, 5 Drawing Sheets

VOICE-ENABLED USER INTERFACE FOR VOICEMAIL SYSTEMS

RELATED APPLICATIONS

This application claims the benefit of U.S. Provisional Patent Application Ser. No. 60/263,469, entitled "Universal Voicemail Gateway (UVG)," filed Jan. 22, 2001, which is incorporated herein by reference.

BACKGROUND OF THE INVENTION

1. The Field of the Invention

The present invention relates to a voice-enabled user interface for accessing a telephone service system that responds to dial tones. More particularly, the present invention relates to methods and systems for enabling a user, with voice commands, to access and navigate a telephone service system that only recognizes dual tone multi-frequency signals.

2. The Prior State of the Art

Through the years, it has become commonplace to use a telephone, not only to communicate, but also to perform electronic business and financial transactions, and to obtain prerecorded information. It is possible to perform these activities over a telephone, in part, because of the development of corresponding telephone service systems, which are used in virtually every industry and business environment.

Voicemail is perhaps the most common type of telephone service system. Voicemail, like an answering machine, enables an incoming telephone message to be recorded for review by an intended recipient at a later time. However, unlike an answering machine, voicemail can record an incoming message even when a corresponding telephone is "off the hook." Accordingly, voicemail is particularly useful when a person cannot answer an incoming telephone call because that person is already engaged in another telephone call.

The prior art also includes various other types of telephone service systems that facilitate business and financial transactions and enable users to obtain prerecorded information. Essentially, a telephone service system includes any automated system that provides a user with data over a telephone device. Virtually every industry uses a telephone service system of one type or another, even if the telephone service system consists of only a customized telephone directory of available business services or personnel.

Some of the more useful telephone service systems enable users using a telephone device to interact with a business network to transact various activities, such as for performing home banking, purchasing consumer products, receiving customer support, and accessing news, entertainment, financial, and travel information. Some telephone service systems also enable a user to access information that is generated on-the-fly, such as when a telephone service system generates text-to-speech translations of dynamic information.

Telephone service systems are particularly useful from a user's perspective because they enable a user to access information and to make business and financial transactions when and where it is most convenient for the user. Telephone service systems are useful from a business's perspective because they enable businesses to hire fewer employees to answer incoming calls and to perform other tasks that can be automated by telephone service systems.

One problem with certain telephone service systems, however, is that they only recognize dual tone multi-frequency signals ("DTMF") signals. A DTMF telephone service system is generally problematic because a user can only use the system by manually pressing the keys on a DTMF telephone keypad. This is a problem because it is easy for a user to inadvertently press an incorrect key, sometimes without realizing it. Pressing an incorrect key may result in an undesirable consequence. For example, by pressing an incorrect key a user may cause the telephone service system to transition from one menu state to an undesired menu state. This may also require a user to return to the prior menu state before a desired selection can be made. This is not only inconvenient, it is a waste of time. By pressing incorrect keys, a user may also cause a telephone service system to perform an act that is not desired. For example, by pressing an incorrect key, a telephone service system may terminate a phone call, call a wrong extension number, or in the case of home banking, transfer an incorrect amount of money between accounts or to a wrong account. It should be appreciated that these examples are given by way of illustration and not limitation.

To overcome the problems that are associated with inadvertently pressing a wrong key, many telephone service systems provide prompts that request a user to confirm certain entries before they are processed. This, however, does not resolve the underlying problem associated with DTMF telephone service systems, namely, requiring a user to enter input by pressing keys on a telephone keypad.

Another problem associated with DTMF telephone service systems is that a user is required to move a handheld telephone back and forth between a position that enables the user to listen to the voicemail system and to a position that allows the user to press keys on the telephone keypad. Having to do this is inconvenient. It can also be dangerous, particularly for a person who is driving a car because it may require that person to take his eyes off the road and his hands off the steering wheel.

To overcome the problems associated with DTMF telephone service systems, the industry has developed telephone service systems that recognize speech so that a user can speak commands and other input without having to press keys on a telephone keypad. There are various methods for performing speech recognition, which are well known in the art. Some examples include spectral analysis, dynamic time warping, neural networks, and recognition by discrete and continuous hidden Markov modeling.

Although speech recognition telephone service systems provide a significant advantage over DTMF telephone service systems, they do not resolve all of the associated problems with the prior art telephone service systems. In particular, a user must still expend the time that is necessary to move systematically through a hierarchy of levels or menu states that are associated with the menu structure of a telephone service system, even when a user already knows what the final menu state will be. For example, from a main menu a user may be required to transition through several "in between" menu states before finally reaching a final menu state that contains the information that is desired by the user. Many telephone service systems also require a user to return to the main menu before navigating to a second desired menu state. Navigation through a menu hierarchy is particularly time consuming when the hierarchy is complex, or has many menu states. This type of navigation through a telephone service system can also be expensive, particularly when access to the telephone service system requires a user to incur costs associated with long-distance and/or a wireless telephone service plan.

Another problem with speech recognition telephone service systems is that because of variations in speech it is impossible to guarantee that speech recognition software will recognize user input. It is also expensive for businesses to modify existing DTMF telephone service systems to recognize and process audio and vocal data with speech recognition software.

Accordingly, it would be beneficial to provide a method for enabling a user to use an existing DTMF telephone service system by speaking into a telephone device without requiring modification to the DTMF telephone service system. It would also be beneficial to accomplish this while enabling a user to jump to any level or state in a menu hierarchy of a telephone service system without requiring the user to systematically navigate through numerous "in between" menu states.

SUMMARY OF THE INVENTION

The present invention is directed towards a voice-enabled user interface for enabling a user to speak over a telephone device to access data from a telephone service system that is only responsive to dual tone multi-frequency ("DTMF") signals.

In one embodiment, a user accesses the voice-enabled user interface with a telephone device and enters authentication information. The voice-enabled user interface verifies the identity of the user and accesses a telephone service system that has information that is desired by the user, but which is only responsive to DTMF signals. The user responds to prompts generated by the telephone service system by speaking into the telephone device. The voice-enabled user interface translates the user's input into a DTMF translation that is recognized by the telephone service system. The voice-enabled user interface maps the hierarchy of menu states and corresponding prompts of the telephone service system within a template. During use, the voice-enabled user interface uses the template to determine what menu state the telephone service system is in at all times. A user can jump from one menu state to another menu state by providing input that the voice-enabled user interface associates with a corresponding menu state. The voice-enabled user interface generates output that causes the telephone service system to transition to the menu state that corresponds with the user input. Once the telephone service system is in the appropriate menu state, the voice-enabled user interface transmits a DTMF translation of the user input to the telephone service system so that it can be processed.

One advantage of the present invention is that it enables users using voice commands to access data from existing DTMF telephone service systems without requiring any modification to the existing systems. The present invention also enables users to navigate through a hierarchy of menu states of a telephone service system without requiring the users to enter input to transition through "in between" menu states. Instead, the invention enables a user to jump over "in between" menu states, from a first menu state to a second menu state with only a single user input.

These and other objects, features, and advantages of the present invention will become more fully apparent from the following description and appended claims, or may be learned by practicing the invention as set forth below.

BRIEF DESCRIPTION OF THE DRAWINGS

A more extensive description of the present invention, including the above-recited features and advantages will be rendered with reference to the specific embodiments that are illustrated in the appended drawings. Because these drawings depict only exemplary embodiments, the drawings should not be construed as imposing any limitation on the present invention's scope. As such, the present invention will be described and explained with additional specificity and detail through use of the accompanying drawings in which.

DETAILED DESCRIPTION OF THE PREFERRED EMBODIMENTS

Figure 1:
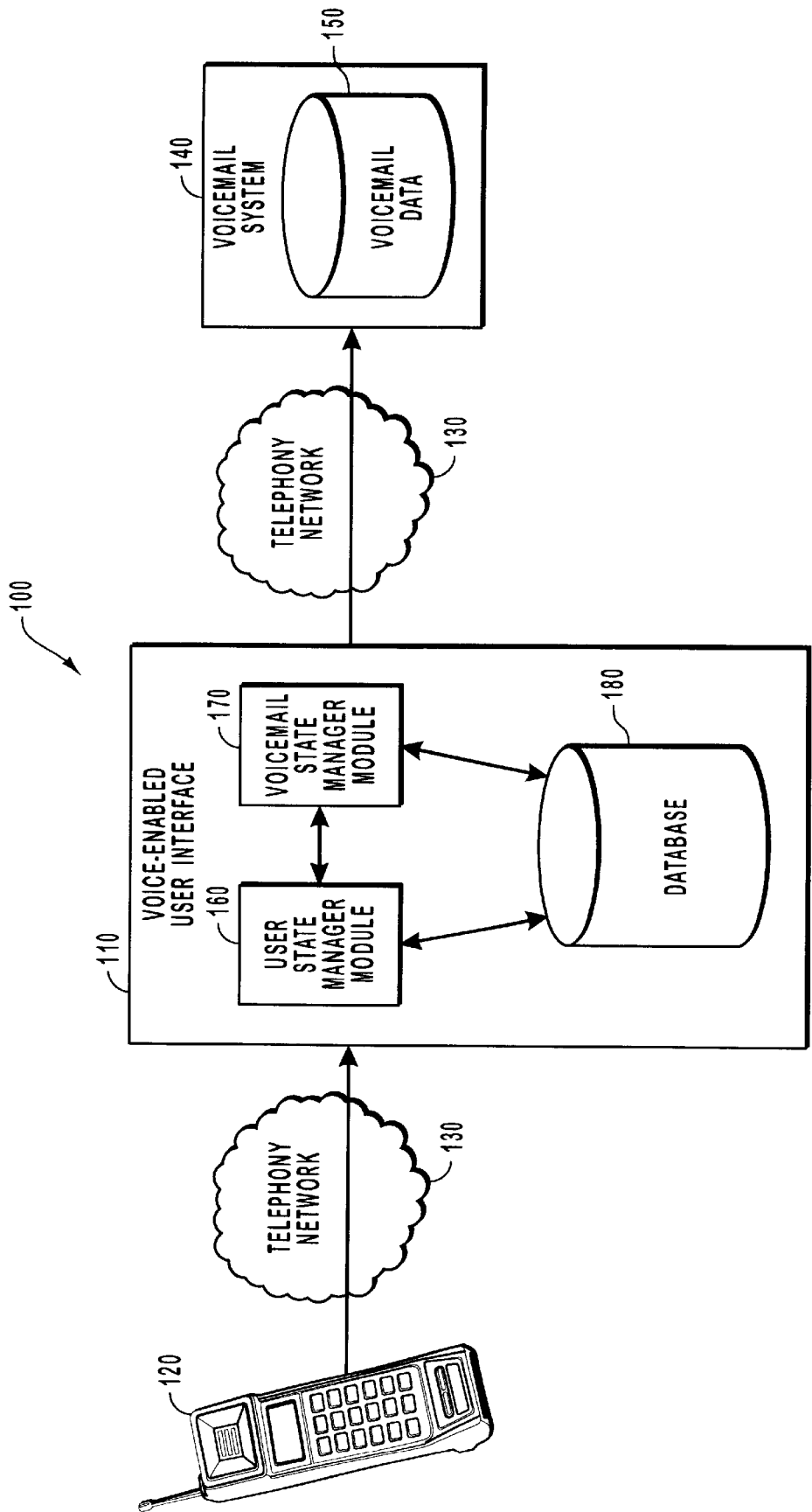
FIG. 1 is a block diagram showing one suitable network environment for practicing the invention that includes a telephone device, a voice-enabled user interface, and a telephone service system.

The present invention is directed to a voice-enabled user interface and methods for enabling users to access and use an existing telephone service system that is only responsive to dial tone signals. More particularly, the present invention enables users to speak into a telephone device to access data from an existing telephone service system that is only responsive to dual tone multi-frequency ("DTMF") signals.

The term telephone service system, as used herein, should generally be construed to include any telephone service that is responsive to user input entered over a telephone device and is capable of providing data to a user. One type of telephone service system that can be accessed by using the present invention includes a voicemail system.

Users can perform various functions with a voicemail system. These functions include, but are not limited to, listening to messages that are left by a third party, recording messages or greetings for a third party to listen to, forwarding messages, deleting messages, and configuring voicemail answering and recording procedures. Users perform functions with a voicemail system by entering input into a telephone device that can be recognized and processed by the voicemail system. DTMF voicemail systems are one type of voicemail systems that are only responsive to DTMF signals. DTMF voicemail systems cannot recognize audio or vocal input.

In one embodiment of the invention, a voice-enabled user interface enables users to perform functions with a DTMF voicemail system by only speaking into a telephone device. It should be appreciated, however, that although certain embodiments of the present invention are described as applying to DTMF voicemail systems, the invention is not limited to any particular type of telephone service system. Similarly, a user can access and use the voice-enabled user interface of the invention with any type of telephone device, including, but not limited to wire bound telephones, wireless telephones, cellular telephones, digital telephones, and PDA's and computers having telephony capabilities.

Embodiments of the invention, as described herein, may comprise a special purpose or general-purpose computer comprising various computer hardware. Embodiments may also include computer-readable media having computer-executable instructions or data structures stored thereon. Such computer-readable media can be any available media that can be accessed by a general-purpose or special-purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired executable instructions or data structures and which can be accessed by a general-purpose or special-purpose computer.

When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general-purpose computer, special-purpose computer, or special-purpose processing device to perform a certain function or group of functions. The computer-executable instructions and associated data structures represent an example of program code means for executing the steps of the invention disclosed herein.

The invention will be described in the general context of computer-executable instructions, such as program modules, being executed by a computer. Generally, program modules include routines, programs, objects, components, data structures, or the like that perform particular tasks or implement particular abstract data types. Moreover, those skilled in the art will appreciate that the invention may be practiced with other computer system configurations, including handheld devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, one suitable environment 100 for practicing the method of the invention for enabling a user to access data from a telephone service system is illustrated. As shown, a voice-enabled user interface 110 is in communication with a telephone device 120 and a telephone service system through telephony networks 130. The invention may be practiced in various telephony network environments, including, but not limited to Public Switched Telephone Networks (PSTN), Integrated Services Digital Network (ISDN) and Fiber Distributed Digital Interface (FDDI). In the present embodiment, the telephone service system comprises voicemail system 140 which can be accessed by a user using telephone device 120.

Voicemail system 140 comprises voicemail data 150 that can include any type of data that can be transmitted to a user over a telephone device. In one preferred embodiment, voicemail data 150 comprises a prerecorded message, such as, for example, a menu prompt, a telephone phone message, a greeting, etc. Voicemail data 150 may also include data that is dynamic or that is accessed from another network. For example, in one embodiment, voicemail system 140 comprises a telephone service system of a financial institution and voicemail data 150 includes dynamic stock quote data that is obtained by the voicemail system 140 from another network. Voicemail data 150 may also include data that is generated on-the-fly. For example, stock quotes can be provided to voicemail system 140 in the form of text, such that during use voicemail system 140 generates a text-to-speech translation of the stock quotes on-the-fly.

According to the present embodiment, voicemail system 140 is responsive only to DTMF signals that are generated by pressing the keys on a keypad of a DTMF telephone device, such as telephone device 120. DTMF telephone signals are well known in the art of telephone communications. According to this embodiment, voicemail system 140 cannot recognize audio or vocal input that is generated by a user speaking into telephone device 120. However, voice-enabled user interface 110 of the invention, enables a user to access voicemail data 150 from the voicemail system 140 by speaking into a telephone device 120, as will be described herein.

Voice-enabled user interface 110 contains various components that enable a user to access voicemail data 150 from voicemail system 140. These components are generally described in reference to a user state manager module 160, a voicemail state manager module 170, and a database 180.

Figure 2:
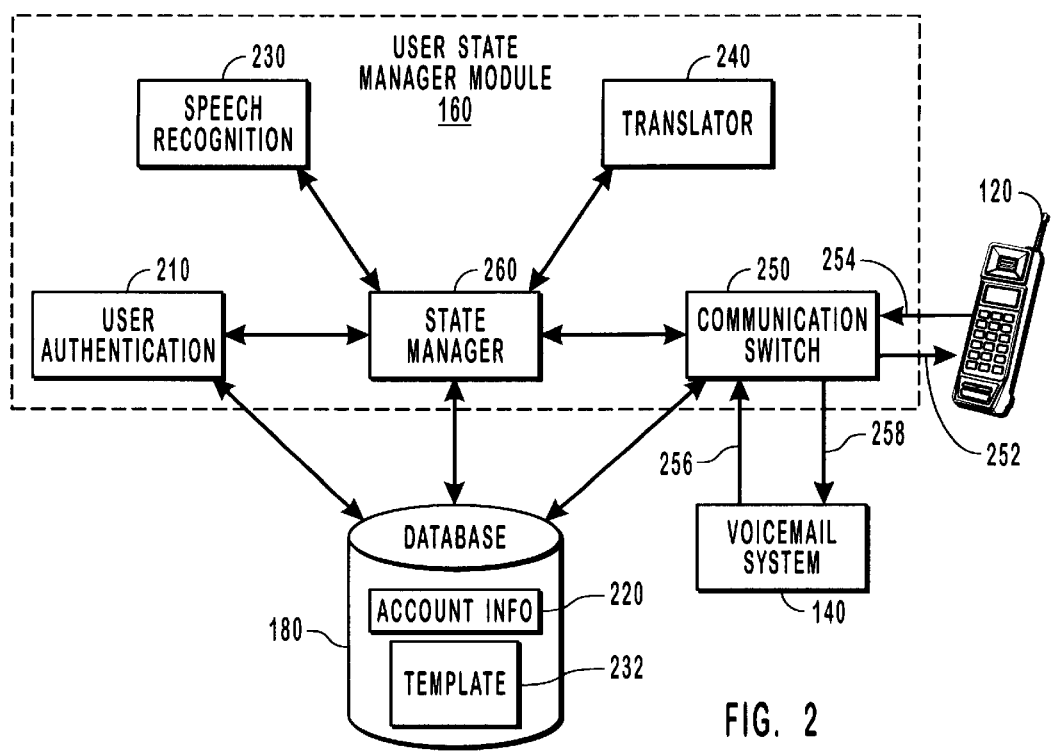
FIG. 2 is a block diagram showing increased detail of the components that make up the user state manager module of the voice-enabled user interface of the present invention.

FIG. 2 shows some of the basic components that make up user state manager module 160. User authentication 210 verifies the identity of a user accessing the voice-enabled user interface 110 by comparing the user account information to account information 220 that is stored in database 180. The act of verifying the identity of the user may require the user to enter a password, personal identification number, an account number, or any other information that can be verified by user authentication 210.

According to one embodiment, and upon authenticating the identity of the user, user authentication 210 connects the voice-enabled user interface to a telephone service system that contains data that is desired by the user, such as voicemail system 140. According to this embodiment, user account information 220 includes information that is used to connect to and access voicemail system 140. For example, user account information 220 can include a telephone number for calling voicemail system 140, and account information and a password for accessing voicemail system 140.

According to another embodiment, user account information 220 includes a telephone number for calling voicemail system 140, but does not include account information or a password that is necessary to access voicemail system 140. According to this embodiment, the user must provide the account information and password during use, after user authentication 210 has connected the voice-enabled user interface to the voicemail system 140.

Speech recognition 230 interprets audio or voice data that is received from a telephone device, which is generated by a user speaking into the telephone device. Speech recognition 230 can also interpret user input comprising telephone signals, such as DTMF signals. Techniques for implementing speech recognition 230 are well known in the respective art, and include, but are not limited to spectral analysis, dynamic time warping, neural networks, and recognition by discrete and continuous hidden Markov modeling.

Translator 240 receives user input comprising audio or voice data and translates the data into DTMF signals that can be recognized by voicemail system 140. According to the present embodiment, voicemail system 140 does not recognize audio or voice data and is only responsive to DTMF signals. The accuracy of making a translation of user input into a DTMF signal is enhanced by comparing user input with anticipated user input according to data that is stored in template 232 of database 180. It should be noted that the translation of user input that is generated by translator 240 is not a direct translation, but instead is a translation of the data stored in template 232 that most resembles the user input. Because template 232 has a finite number of acceptable inputs and responses, translator 240 is generally able to make an accurate translation of user input, which can vary from one user to another, by comparing the user input to the known data in template 232.

A template, such as template 232, maps all of the menu states of a telephone menu system and all of the corresponding prompts and acceptable responses and inputs. A technician prepares only a single template for each telephone service system that is accessible to users using the voice-enabled user interface of the invention. Accordingly, a single template is used for making translations of user input from multiple users accessing the same telephone service system.

Communication switch 250 controls the transmission of data through the voice-enabled user interface that is transmitted between a telephone device 120 and voicemail system 140. In one embodiment, two simplex channels 252, 254 connect the voice-enabled user interface to the telephone device 120 and two simplex channels 256, 258 connect the voice-enabled user interface to the voicemail system 140, each set of simplex channels comprising an inbound and an outbound simplex channel. A simplex channel is simply a one-way communication channel. It should be appreciated that other types of communication channels can also be used, such as a half-duplex channel.

According to this embodiment, communication switch 250 synchronizes all communication over the simplex channels 252–258. During use, the communication switch 250 connects the inbound simplex channel 256, from the voicemail system 140, to the outbound simplex channel 252 that is directed to the telephone device 120. This enables the user to hear transmissions of data directly from the voicemail system 140. The communication switch 250 also directs transmissions of data from inbound simplex channel 254 to speech recognition 230, while directing all outbound transmissions of the voice-enabled user interface to voicemail system 140 through outbound simplex channel 258.

The communication switch 250 also enables the voice-enabled user interface to interrupt the voicemail system 140, whenever appropriate, by disconnecting the inbound simplex channel 256 from the outbound simplex channel 252. One appropriate circumstance to interrupt the voicemail system 140 is to prevent the user from hearing prompts that the user does not need to respond to. For example, after user authentication 210 connects the voice-enabled user interface to voicemail system 140, the voicemail system 140 may transmit prompts for the user to enter a valid account number and password.

In one embodiment, the voice-enabled user interface disconnects the inbound simplex channel 256 from the outbound simplex channel 252 while user authentication 210 transmits the user's account number and password to voicemail system 140 from database 180. According to this example, the communication switch 250 prevents the incoming transmission of data from the voicemail system 140 from being transmitted over the outbound simplex channel 252 to the user.

Another appropriate circumstance for interrupting the voicemail system 140 is when the voice-enabled user interface is causing the voicemail system to jump over "in between" menu states, from a menu state to final menu state. This will be described later in reference to FIG. 6.

State manager 260 executes user requests and performs various general control functions. State manager 260 also coordinates the connectivity and operation of other components, such as, for example enabling components 210, 230, 240, and 250 to access database 180, and coordinating the transmission of data to and from components 210, 230, 240, and 250 to simplex channels 252–258.

Figure 3:
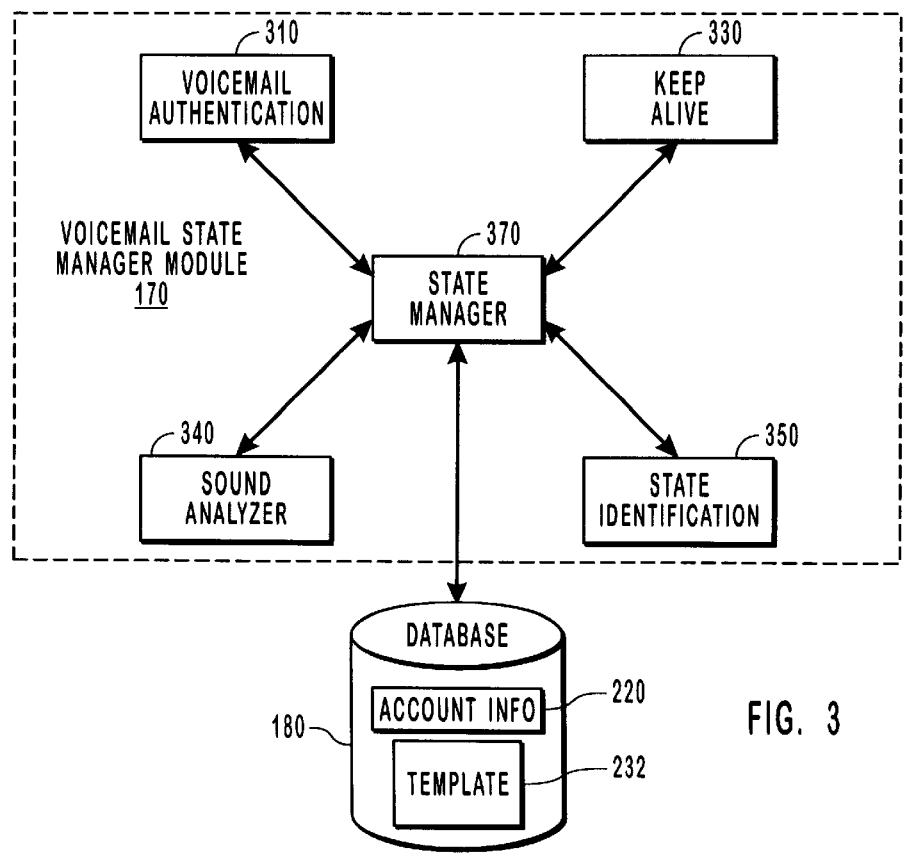
FIG. 3 is a block diagram showing increased detail of the components that make up the voicemail state manager module of the voice-enabled user interface of the present invention.

FIG. 3 shows some of the basic components that make up voicemail state manager module 170, of FIG. 1. In one preferred embodiment, voicemail authentication 310 connects the voice-enabled user interface to voicemail system 140 of FIGS. 1–2. According to this embodiment, voicemail authentication 310 retrieves account information 220 from database 180 and accesses voicemail system 140. Account information 220 can include a telephone number for calling voicemail system 140, and account voicemail information and password for accessing voicemail system 140.

According to another embodiment, necessary account information 220 includes a telephone number for calling voicemail system 140, but does not include account information or a password for accessing voicemail system 140. According to this embodiment, a user must provide the account information and password during use, after voicemail authentication 310 has accessed the voicemail system 140.

Keep alive 330 keeps a telephone service system in synch with the voice-enabled user interface by generating output comprising DTMF signals that cause the telephone service system to remain in a current menu state or to transition to another menu state. Methods for causing a telephone service system to transition to another menu state will be described later in reference to FIG. 6.

Sound analyzer 340 parses audio or voice data that is received from a telephone service system, such as voicemail system 140 of FIGS. 1–2. Voicemail data 150 that is received from the voicemail system 140 comprises multiple sound wave patterns that occur in segments over a measurable period of time. According to one embodiment, sound analyzer determines the number of segments of data and the length of time over which each of the segments occur. According to this embodiment, sound analyzer 340 does not perform speech recognition of the voicemail data 150. It should be appreciated by one skilled in the art of speech recognition, that this method for parsing audio or voice data is much simpler, and hence can be performed much faster and more accurately than other methods that are required for performing speech recognition. However, any other form of sound analysis could be used with the invention.

State identification 350 determines what menu state the telephone service system is in at all times by comparing the parsed audio or voice data from sound analyzer 340 with data contained in template 232 of database 180. In one presently preferred embodiment, template 232 contains a map of all the menu states of a telephone service system and all the prompts corresponding to each of the menu states. The template 232 also contains information that associates each of the state specific prompts with a number of segments and segment lengths that are determined according to the parsing method performed by sound analyzer 340. State identification 350 also tracks changes in menu states by recognizing when output generated by keep alive 330 causes a telephone service system to transition from one menu state to another.

State manger 370 executes user requests, performs various general control functions, and coordinates the connectivity and operation of other components, such as, for example enabling components 310, 330, 340, and 350 to access database 180. State manager 370 also coordinates the transmission of data to and from components 310, 330, 340, and 350 with simplex channels 252–258 of FIG. 2.

Figure 4:
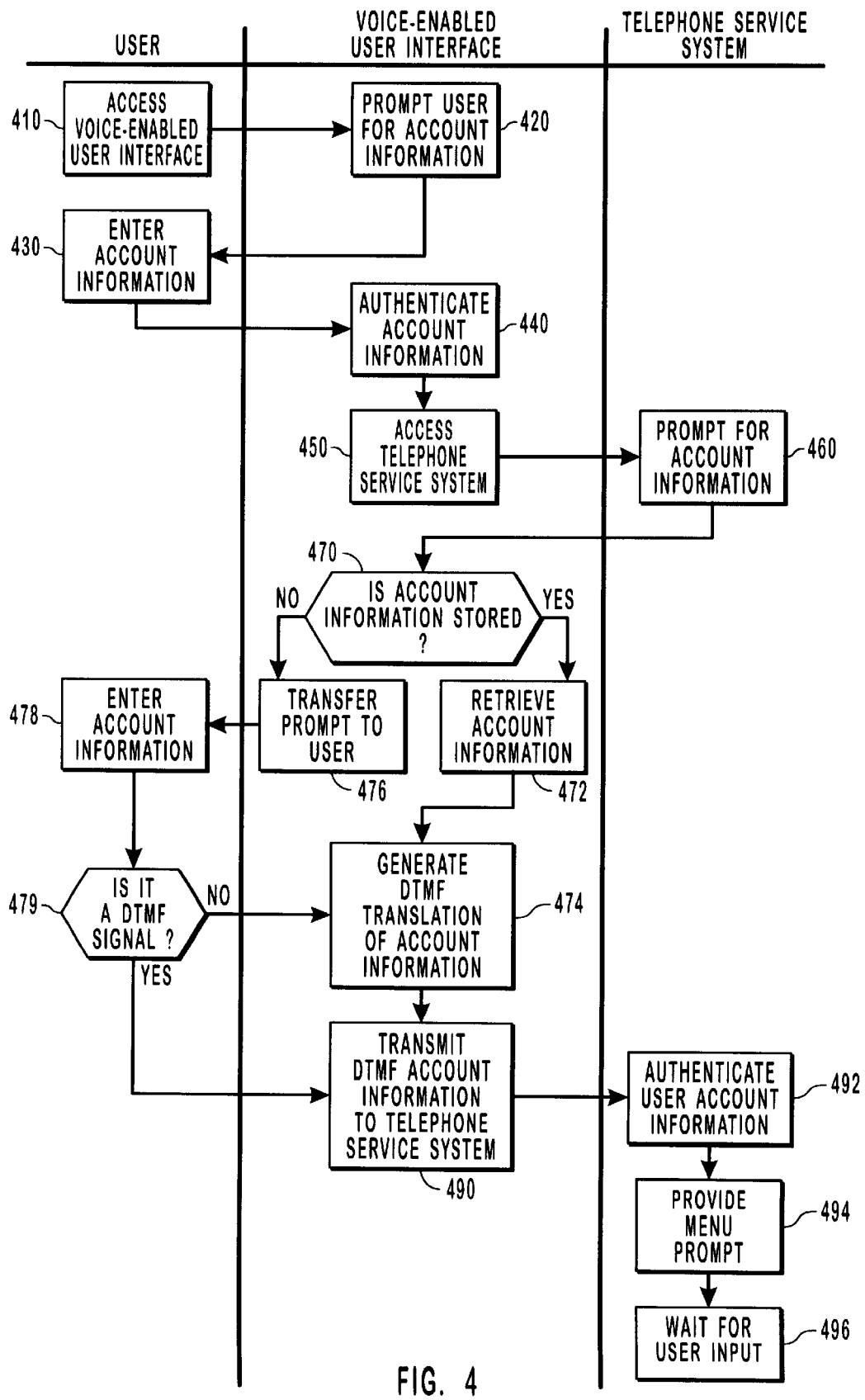
FIG. 4 is a flow chart illustrating an embodiment for enabling a user to access a telephone service system with the voice-enabled user interface of the invention.

FIG. 4 shows a flow diagram illustrating how a user can access a telephone service system with a voice-enabled user interface of the invention. First, in step 410, the user accesses the voice-enabled user interface. This can be accomplished in various ways depending on the type of telephone device that is used by the user to access the voice-enabled user interface. In one embodiment, the user uses a touchtone telephone and dials a telephone number that connects the telephone with the voice-enabled user interface. Next, in step 420, the voice-enabled user interface prompts the user for account information. The user responds to the prompt by entering account information, step 430. This is accomplished by the user either speaking the account information or by pressing the corresponding keys on a telephone keypad. The account information is authenticated by the voice-enabled user interface, step 440, by comparing the account information provided over the telephone with user account information stored in a database.

Once the user's identification is authenticated then the voice-enabled user interface can contact the telephone service system, step 450. This is accomplished when the voice-enabled user interface retrieves and dials a telephone number from its database. In some embodiments this is all that is required to access a telephone service system. However, in other embodiments, the user's telephone service system account information must also be authenticated by the telephone service system, step 460. In these embodiments, it is first necessary to determine whether the user's telephone service system account information is stored in the database of the voice-enabled user interface, step 470. If it is, then the voice-enabled user interface can retrieve the account information and generate a DTMF translation of the account information, steps 472 and 474. However, if the user's telephone service system account information is not stored, then the user is prompted for the appropriate account information. To do this, the voice-enabled user interface transfers the prompt for account information from the telephone service system to the user's telephone device, step 476.

The user can then enter the account information into the telephone by speaking or by pressing keys on the telephone keypad, step 478. If the account information is entered on a DTMF telephone keypad, it comprises DTMF tones that can be recognized by the telephone service system. It is important to determine whether the account information comprises a DTMF signal, step 479, because if it does not, it will not be recognized by the telephone service system. If the user enters account information by speaking or the account information does not comprise a DTMF signal, it must first be translated into an appropriate DTMF translation, step 474, so it can be recognized by the telephone service system.

Once DTMF account information is received by the voice-enabled user interface, it is transmitted to the telephone service system, step 490. The telephone service system authenticates the account information, if it is accurate, and provides the user with a menu prompt and waits for additional user input, steps 492–496.

Once a user has obtained access to the telephone service system through the voice-enabled user interface of the invention, the user can interact with the telephone service system as if the voice-enabled user interface was not present. For example, the user can listen to prompts provided by the telephone service system and respond to those prompts by pressing keys on a telephone keypad that correspond with prompted menu selections. In doing this, the user can also navigate through the telephone service system by systematically moving from one menu state to another menu state as prompted.

Accordingly, it should be appreciated that the voice-enabled user interface of the invention does not restrict the use or navigation of an existing DTMF telephone service system. To the contrary, the invention provides enhanced operability and improved navigation of existing DTMF telephone service systems by enabling the user to enter vocal and audio input and to jump from one menu state to another menu state without having to provide input to transition through "in between" menu states. The advantages of the invention over the prior art will be made more fully apparent by the discussion that follows in reference to FIGS. 5–6.

Figure 5:
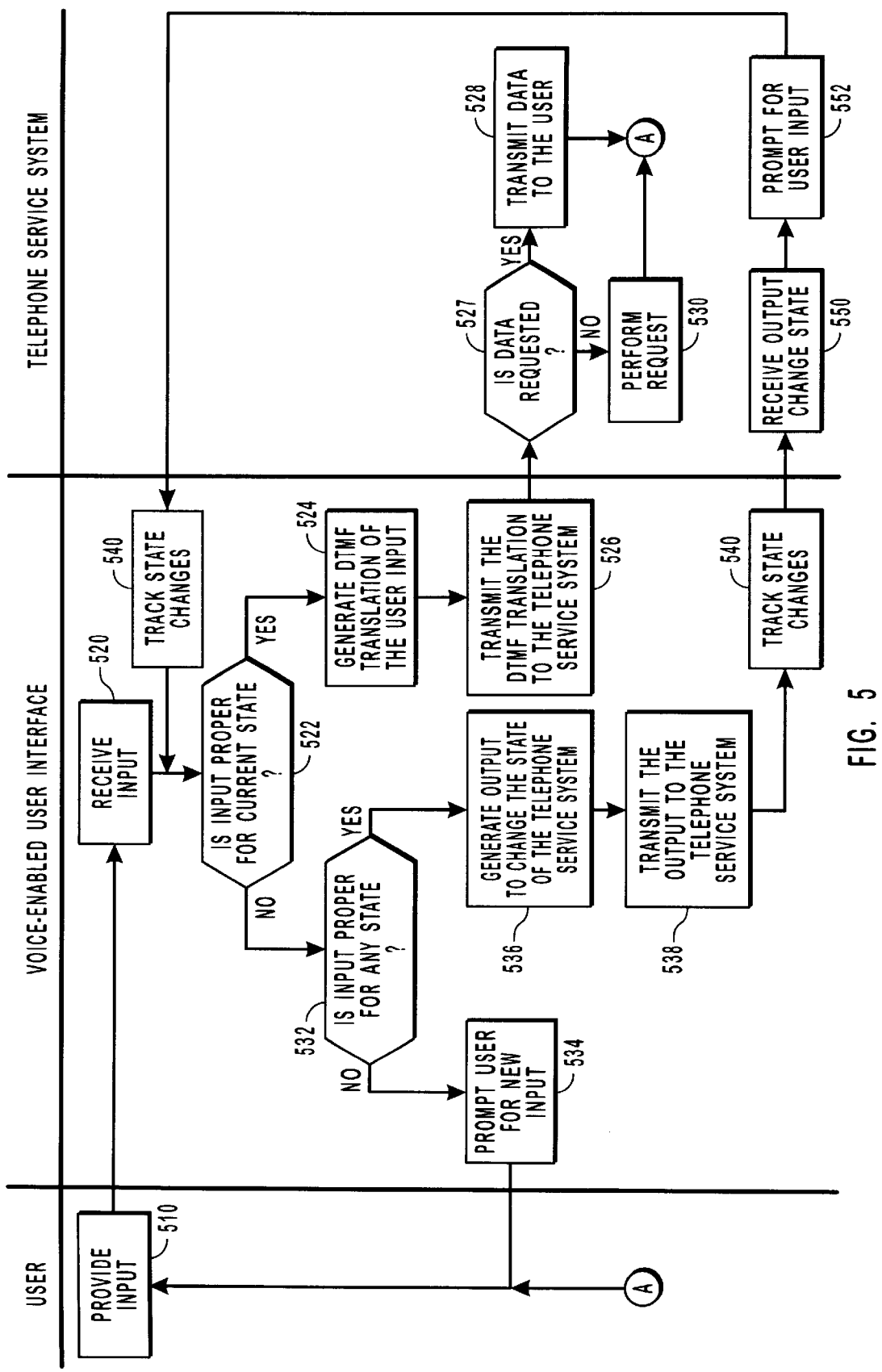
FIG. 5 is a flow chart illustrating an embodiment of the invention for enabling a user to access data from a telephone service system with the voice-enabled user interface of the invention.
Figure 6:
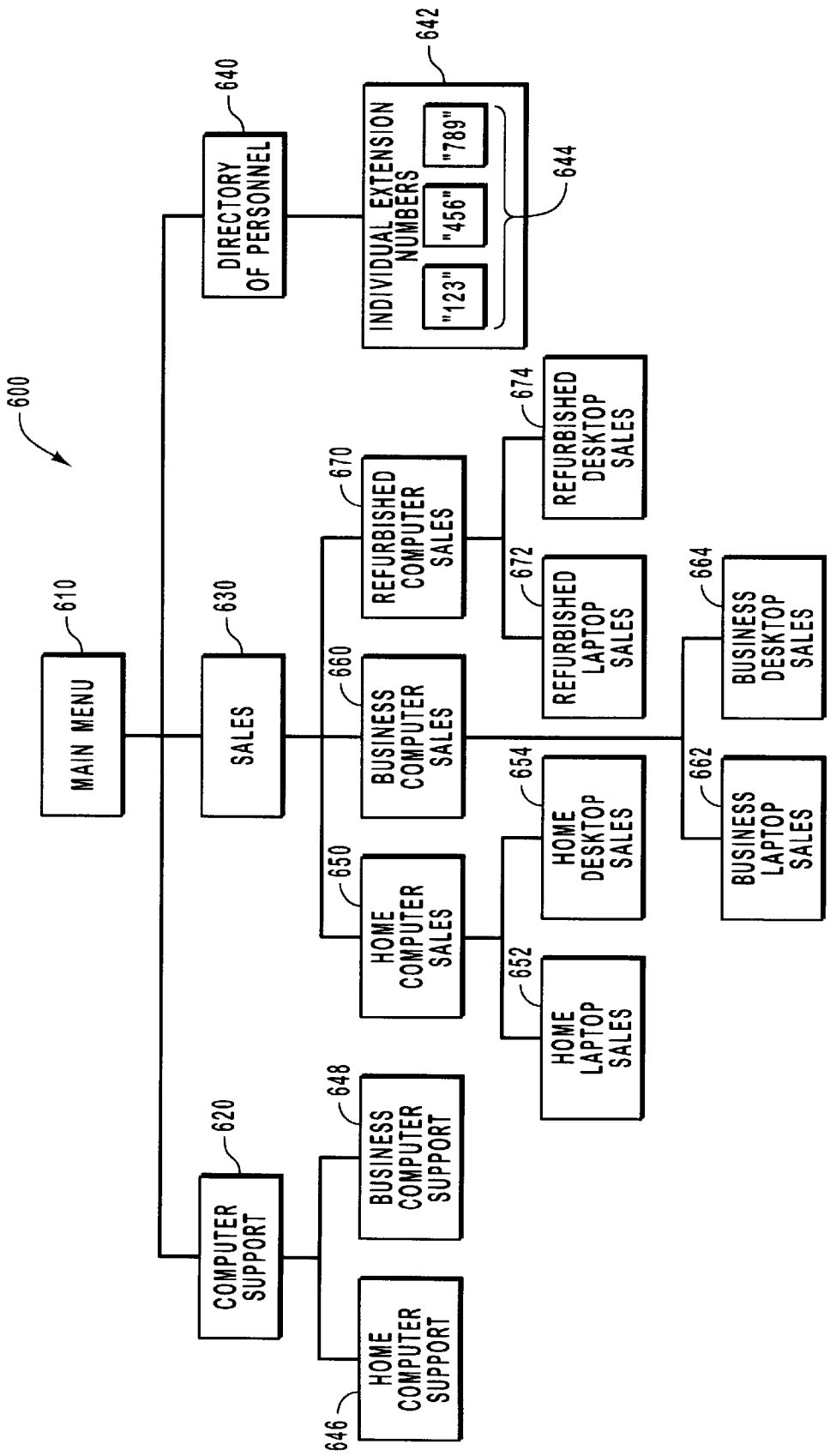
FIG. 6 is a block diagram illustrating one embodiment of a hierarchal menu structure of a telephone service system that can be accessed and navigated using the voice-enabled user interface of the invention.

One method of the invention for enabling users to access data from a telephone service system that is only responsive to DTMF signals can be accomplished by performing the steps or acts shown in the flow chart of FIG. 5 and will be generally described in reference to FIGS. 5–6.

Because each figure number is incorporated into individual references, i.e., reference 510 appears in FIG. 5 and reference 620 appears in FIG. 6, the specific figure number may be inferred and therefore may not be explicitly identified in the discussion that follows. As shown, the first act 510 is for a user to provide input. Input is generated by a user using a telephone device and can comprise either DTMF signals, or audio and voice signals, or a combination of both.

The voice-enabled user interface receives the user input, step 520, and determines whether the input is proper for the current menu state of the telephone service system, step 522. A menu state is a menu or submenu of a menu hierarchy of a telephone service system.

Menu hierarchy 600 is one embodiment of a menu hierarchy of a telephone service system of a computer sales organization. As shown, menu hierarchy 600 comprises a main menu 610 and three first level submenus comprising computer support 620, sales 630, and a directory of personnel 640. The directory of personnel 640 includes a submenu for individual extension numbers 642 comprising the extension number for each employee of the organization. Although only three extension numbers 644 are shown, it should be appreciated that there may be any number of employees and corresponding extension numbers. Directories of personnel are a common menu feature of a telephone service system for enabling a user to contact an employee by identifying and dialing the employee's extension number.

Computer support 620 comprises two additional submenu selections, one for home computer support 646 and one for business computer support 648. Sales submenu 630 is divided into three submenus that include home computer sales 650, business computer sales 660, and refurbished computer sales 670, each of which is divided into additional submenus for (home, business, and refurbished) laptop and (home, business, and refurbished) desktop sales, 652, 654, 662, 664, 672, and 674, respectively. Main menu 610 and each of the submenus 620–674 comprise discrete menu states of menu hierarchy 600.

If it is determined that the user input is a proper input for a current menu state, and assuming the input does already comprise a DTMF signal, the voice-enabled user interface generates a DTMF translation of the user input, step 524. Translating the user input into a DTMF signal is important because without translation, the telephone service system will not be able to recognize or process the input. Once a DTMF translation is made then it is transmitted to the telephone service system, step 526. Upon receiving user input, and depending on whether the user input is a request for data, step 527, the telephone service system either transmits data to the user, step 528, or performs a requested process, step 530. Examples of performing a requested process include deleting a message, transitioning to a different menu state, forwarding a message, etc. After transmitting requested data or performing a requested process, the telephone service system waits for additional user input. The telephone service system may also prompt the user for additional input.

If the voice-enabled user interface determines that the user input is not proper for a current state of the telephone service system, then the voice-enabled user interface determines whether the input is proper for any state of the telephone service system, step 532. If the input is not proper for any other state then the voice-enabled user interface prompts the user for new input, step 534. This may be accomplished by any appropriate means. For example, the voice-enabled user interface may inform the user that the last input was not properly received and may request the user to resubmit the user input or selection. The voice-enabled user interface can also provide other prompts to assist the user. One reason input may determined to be improper is that it is not interpreted properly because of limitations of speech recognition.

An example will now be provided to illustrate how user input is sometimes not proper for a menu state. In this example, a user is prompted at the main menu 610 to "press 1 followed by # for sales," "press 2 followed by # for computer support," "or press 3 followed by # for a directory of personnel." If a user, while in the main menu, wishes to speak to a person assigned extension number "123," the user must first enter "1#" by keypad entry or by speaking. Then the telephone service system transitions to directory of personnel menu state 640. In this menu state, the user will then be prompted to "dial the extension number of the person with whom you would like to speak." If the user enters "123" then the telephone service system will connect the user to extension number 123.

According to the prior art, however, if the user enters "123" from the main menu state 610 then nothing will happen because "123" is not a proper input from the main menu state 610. In fact, according to the prior art, the telephone menu system will not even recognize the input "123" from the main menu state 610. However, according to the present invention, if the input "123" is entered from the main menu state 610, the voice-enabled user interface will identify the user input as a valid input for another state of the menu hierarchy 600.

Another reason why user input may be deemed improper is because a user may be entering input which the user believes is correct, but which is incorrect because the user has made one or mistakes while entering the input. If this is the case, the voice-enabled user interface can provide the user with prompts for a correct input that is most similar to what the user entered. The following example is given to illustrate how this might transpire.

If a user enters the main menu 610 of the telephone service system of the computer sales organization with the desire to purchase a refurbished laptop computer, the user can systematically enter input in response to menu prompts to reach refurbished laptop sales 672 by navigating through sales 630 and refurbished computer sales 670 to arrive at refurbished laptop sales 672. Alternatively, according to the invention, a user can jump directly to refurbished laptop sales 672 by speaking the words "refurbished laptop sales." If the user mistakenly says, "refurbished laptop computers," or "refurbished notebook sales," the voice-enabled user interface prompts the user with a clarifying prompt, such as "Would you like refurbished laptop sales or refurbished desktop sales?" The user can then enter the appropriate input "refurbished laptop sales."

The voice-enabled user interface is able to determine what menu prompts are most similar to the input entered by the user because all of the menu prompts and acceptable inputs and requests are mapped in a template, as described above. A simple process of comparing the user input with the accepted inputs and requests on file can be used to determine what the user is attempting to do or say. Additional data can also be stored in the template to associate common correlating inputs with the acceptable inputs and requests. If it cannot be determined what a user is attempting to input, the voice-enabled user interface reverts to step 534 and prompts the user for new input.

It should be appreciated that by mapping the menu hierarchy 600, including all menu prompts associated with menu states of the menu hierarchy 600, the invention enables a user to jump from one menu state to another menu state without having to enter input for every "in between" menu state. For example, from main menu 610 a user can state "123" and the user will automatically be transferred to extension 123. Alternatively, a user can jump from home laptop sales 652 to home computer support 646 by speaking "home computer support." It is not necessary for the user to first return to the main menu 610 and then transition down to home computer support 646. It should be appreciated that this is one advantage of the invention over the prior art. This advantage should be appreciated even more fully when considering that, according to the present embodiment, the telephone service system of menu hierarchy 600 cannot recognize audio or vocal commands, but instead is only responsive to DTMF signals.

The process for enabling the voice-enabled user interface of the invention to jump from one menu state to another menu state is made possible by mapping the menu hierarchy 600 within a template of the invention and by tracking all menu state changes as they occur. This way the voice-enabled user interface is constantly aware of what menu state the telephone service system is in at all times and is also aware of what menu state transitions need to occur in order to move the telephone menu system from a current menu state to a menu state that is requested by user input.

To cause the telephone service system to jump from a first menu state to a second menu state, the voice-enabled user interface generates and transmits output to the telephone service system that causes the telephone service system to traverse the one or more menu states it is jumping over, steps 536, 538. For example, if the telephone service system is in the menu state of business laptop sales 662 when the user speaks "home laptop sales," then the voice-enabled user interface generates and transmits output to the telephone service system that causes the telephone service system to first transition to business computer sales 660, then to sales 630, then to home computer sales 650, and then finally to home laptop sales 652. It should be appreciated that all of the communications associated with jumping from one menu state to another menu state are conducted without the knowledge and efforts of the user, which is an improvement over the prior art.

New output is generated and transmitted by the voice-enabled user interface for each transition that is required between menu states and is given in response to the state specific prompts that are generated by the telephone service system at each of the menu states, steps 536, 538. The voice-enabled user interface is aware of what state the telephone service system is in at all times because it tracks the menu state changes as they occur based on the output that is transmitted to the telephone service system and based on the prompts that are received from the telephone service system, step 550.

Whenever the telephone service system receives output from the voice-enabled user interface it makes a corresponding menu state change, step 550, and, if appropriate, it generates prompts for new user input corresponding to the new current menu state, step 552. The voice-enabled user interface intercepts the prompts to track the menu state changes, step 540, and repeats steps 522, 532, 536 and 538 until the telephone service system is in an appropriate menu state to receive the user input.

During this whole process the user is unaware of the prompts that are provided by the telephone service system and the output that is generated by the voice-enabled user interface because communication switch 250 disconnects the inbound simplex channel 256 of the telephone service system from the outbound simplex channel 252 that is directed to the user.

If there are many transitions that have to occur, such as when making a big jump in a menu hierarchy, then the user will be presented with a pause for a period of time. The user can be notified during the pause that the user's request is being processed. The user can also be provided music or advertising material during the pause so that the user does not think the communication session was disconnected. U.S. patent application Ser. No. 09/464,990, entitled Voice Marketing for Voice-Accessible Information Service, and filed Dec. 16, 1999 provides additional disclosure regarding how advertising material can be presented to a user during pauses and is incorporated herein by reference.

According to another embodiment, the user can interrupt any step in the flow diagram of FIG. 5 by providing new input. For example, if the telephone service system is in the process of transmitting data to the user, step 528, the user can provide new input, step 510, to interrupt the transmission of data to the user. Although the telephone service system may still continue to transmit data, the channel switch of the voice-enabled user interface disconnects the simplex channels that enable the user to hear the data transmission. The process then resumes with step 522 by determining whether the input is proper for the current menu state of the telephone service system.

It should be appreciated that the invention, as it has been described herein, generally enables a user speaking into a telephone device to access data from a telephone service system that is only responsive to DTMF signals. One benefit of the invention is that this is possible with out any modification to existing telephone service systems. Another benefit of the invention is that it enables a user to navigate through the hierarchal menu of a telephone service system without having to enter input for "in between" menu states that are traversed from a current menu state to a selected menu state. It should be appreciated that these benefits of the invention are advantages over the prior art.

The present invention may be embodied in other forms without departing from its spirit or essential characteristics.

As properly understood, the preceding description of specific embodiments is illustrative only and in no way restrictive. For example, the use of a touchtone telephone to access a DTMF voicemail system does not limit the invention to application of any specific type of telephone device or telephone service system. The scope of the invention is, therefore, indicated by the appended claims as follows.

What is claimed and desired to be secured by United States Letters Patent is:

1. In a network that includes a voice-enabled user interface in communication with a telephone device and a telephone service system, a method performed at the voice-enabled user interface for enabling a user at the telephone device to access data from the telephone service system with user input that is not recognizable by the telephone service system, the method comprising the acts of:

receiving a prompt from the telephone service system, wherein the telephone service system comprises a menu having multiple menu states, each menu state having state specific prompts, said prompt being one of the state specific prompts, said prompt comprising speech having multiple sound wave patterns that occur in segments over a period of time;

determining which of the multiple menu states the telephone service system is in using a template that maps the multiple menu states and the state specific prompts;

identifying said prompt by determining the quantity of said segments and the period of time over which each of said segments occur and comparing said segments and period of time with information stored in said template;

transferring said prompt to the user at the telephone device;

receiving a user input that is entered at the telephone device, wherein said user input comprises a request for data from the telephone service system, and wherein said user input is not recognizable by the telephone service system;

transmitting a translation of the user input to the telephone service system, wherein said translation of the user input is recognizable by the telephone service system;

receiving the requested data from the telephone service system; and transferring said requested data to the telephone device.

2. A method as defined in claim 1, wherein the act of identifying said prompt comprises performing spectral speech analysis of the multiple sound wave patterns.

3. A method as defined in claim 1, wherein the user input comprises audio input that is generated by the user speaking into the telephone device.

4. A method as defined in claim 3, further comprising the act of performing speech recognition of the user input.

5. A method as defined in claim 4, wherein the telephone service system only recognizes dual tone multi-frequency signals.

6. A method as defined in claim 5, wherein the content of the translation of the user input that is transmitted to the telephone service system depends upon which of the multiple menu states the telephone service system is in.

7. A method as defined in claim 6, wherein the user input is received prior to the act of receiving the prompt from the telephone service system, and wherein said translation of the user input causes the telephone service system to move from a first of the multiple menu states to a second of the multiple menu states.

8. A method as defined in claim 7, wherein the translation of the user input can only be recognized by the telephone service system when the telephone service system is a third of the multiple menu states.

9. A method as defined in claim 8, wherein prior transmitting the translation of the user input to the telephone service system the voice-enabled user interface transmits output to the telephone service system that causes the telephone service system to move from the third of the multiple menu states to the first of the multiple menu states, such that the translation of the second user input can be recognized by the telephone service system.

10. A method as defined in claim 1, wherein prior to the act of receiving a prompt from the telephone service system, the method further comprises the act of accessing the telephone service system in response to an initial user input.

11. A method as defined in claim 10, wherein the initial user input includes authentication information that verifies the identity of the user.

12. A method as defined in claim 1, further comprising the act of monitoring the current menu state of the telephone service system so as to enable the user to interactively navigate the menu states of the telephone service system.

13. A method as defined in claim 1, wherein the template further identifies acceptable inputs to the prompts.

14. A method as defined in claim 13, further comprising, after the act of receiving the user input, the act of determining whether the user input is an acceptable input to the prompt based on a current menu state of the telephone service system.

15. In a network that includes a voice-enabled user interface in communication with a telephone device and a telephone service system, a method performed at the telephone device for enabling a user to interactively navigate through menu states of the telephone service system with user input that is not recognizable by the telephone service system, the method comprising the acts of:
   transmitting a first user input to the voice-enabled user interface, wherein said first user input causes the voice-enabled user interface to access the telephone service system and wherein the voice-enabled user interface is remote with respect to the telephone device;
   receiving a prompt from the voice-enabled user interface, the prompt being received while the telephone service system is in one of multiple menu states, each menu state having state specific prompts, said prompt being one of the state specific prompts and comprising speech having multiple sound wave patterns that occur in segments over a period of time;
   transmitting a second user input to the voice-enabled user interface, wherein said second user input comprises a request for data from the telephone service system, wherein said second user input is not recognizable by the telephone service system, said voice-enabled user interface, in response to the second user input:
      determining which of the multiple menu states the telephone service system is in using a template that maps the multiple menu states and the state specific prompts;
      identifying said prompt by determining the quantity of said segments and the period of time over which each of said segments occurs and comparing said segments and period of time with information stored in said template;
      obtaining a translation of the second user input based on the template; and
      transmitting to the telephone service system the translation of the second user input that is recognizable by the telephone service system; and
   receiving data from the telephone service system that is responsive to the second user input.

16. A method as defined in claim 15, wherein said prompt is generated at the telephone service system.

17. A method as defined in claim 15, wherein said prompt is generated at the voice-enabled user interface.

18. A method as defined in claim 15, wherein said first and second user input comprise audio input that is generated by the user speaking.

19. A method as defined in claim 15, wherein said data is transmitted through a simplex channel of the voice-enabled user interface.

20. A method as defined in claim 15, wherein said second user input causes the telephone service system to jump from a first menu state to a second menu state.

21. A method as defined in claim 20, wherein said telephone service system can only recognize the second user input when said telephone service system is in a third menu state.

22. A method as defined in claim 21, wherein said second user input is transmitted prior to the user receiving said prompt from the voice-enabled user interface.

23. A computer program product for implementing, in a voice-enabled user interface that is in communication with a remote telephone device and a telephone service system, a method for enabling a user using the remote telephone device to interactively navigate through menu states of the telephone service system with user input that is not recognizable by the telephone service system, the computer program product comprising:
   a computer-readable medium carrying computer-executable instructions for implementing the method, the computer-executable instructions comprising:
      program code means for accessing the telephone service system in response to user input, the telephone service system having multiple menu states, each menu state having state specific prompts;
      program code means for receiving from the remote telephone device user input that has been entered at the remote telephone device in response to a prompt that has been transferred to the user of the remote telephone device, said prompt being one of the state specific prompts and comprising speech having multiple sound wave patterns that occur in segments over a period of time, the user input comprising a request for data from the telephone service system, wherein the user input is not recognizable by the telephone service system;
      program code means for determining which of the multiple menu states the telephone service system is in using a template that represents a map of the multiple menu states of the telephone service system;
      program code means for identifying said prompt by determining the quantity of said segments and the period of time over which each of said segments occurs and comparing said segments and period of time with information stored in said template;
      program code means for obtaining a translation of the second user input based on the template;
      program code means for transmitting output to the telephone service system that causes the telephone service system to transmit requested data to the telephone device; and
      program code means for transmitting output to the telephone service system that causes the telephone service system to move from a first of the multiple menu states to a second of the multiple menu states.

24. A computer program product as defined in claim 23, wherein the computer-readable medium further comprises program code means for authenticating the identity of the user.

25. A computer program product as defined in claim 23, wherein the computer-readable medium further comprises program code means for providing the telephone service system with information that authenticates the identity of the user.

26. A computer program product as defined in claim 23, wherein the computer-readable medium further comprises program code means for controlling the transmission of data between the telephone service system and the telephone device, wherein said program code means comprises program code means for connecting and disconnecting channels of communication between the telephone service system and the telephone device.

27. A computer program product as defined in claim 23, wherein the template, wherein said template comprises a map of the menu states, prompts and acceptable inputs of the telephone service system.

28. A computer program product as defined in claim 27, wherein the program code means for determining which of the multiple menu states the telephone service system is in further comprises program code means for tracking changes to the menu state of the telephone service system and program code means for determining which of the multiple menu states the telephone service system is in at all times.

* * * * *